United States Patent
Prunier

(10) Patent No.: US 7,774,127 B2
(45) Date of Patent: Aug. 10, 2010

(54) METHOD FOR CONTROLLING A MOTOR VEHICLE USING A NETWORK OF NEURONES

(75) Inventor: Thierry Prunier, L'Hay les Roses (FR)

(73) Assignee: Renault S.A.S., Boulogne Billancourt (FR)

( * ) Notice: Subject to any disclaimer, the term of this patent is extended or adjusted under 35 U.S.C. 154(b) by 0 days.

(21) Appl. No.: 11/912,937

(22) PCT Filed: Apr. 25, 2006

(86) PCT No.: PCT/FR2006/050387

§ 371 (c)(1),
(2), (4) Date: Jun. 23, 2008

(87) PCT Pub. No.: WO2006/114550

PCT Pub. Date: Nov. 2, 2006

(65) Prior Publication Data

US 2009/0018752 A1  Jan. 15, 2009

(30) Foreign Application Priority Data

Apr. 28, 2005  (FR) .................................. 05 04285

(51) Int. Cl.
  *G06F 17/00*  (2006.01)
  *F01L 1/34*  (2006.01)
(52) U.S. Cl. .................... 701/106; 123/90.15; 701/103; 701/104

(58) Field of Classification Search ......... 701/101–103, 701/108–110, 114, 106, 115; 123/436, 480, 123/687, 568.21, 568.22, 90.15–90.18, 316
See application file for complete search history.

(56) References Cited

U.S. PATENT DOCUMENTS

| 6,701,244 B2 * | 3/2004 | Oota et al. .................. 701/104 |
| 7,174,250 B2 * | 2/2007 | Barba et al. ................. 701/108 |
| 7,181,335 B2 * | 2/2007 | Barba et al. ................. 701/108 |
| 7,321,820 B2 * | 1/2008 | Yanakiev et al. ............ 701/105 |
| 7,440,838 B2 * | 10/2008 | Livshiz et al. .............. 701/103 |
| 2002/0107630 A1 | 8/2002 | Yagi |

FOREIGN PATENT DOCUMENTS

DE  195 47 496  7/1997
EP  1 04 1264  10/2000

OTHER PUBLICATIONS

Neural Network Toolbox, http//www.mathworks.com/access/helpdesk/help/toolbox/nnet/tansig.html.*
Neural Network, http//en.wikipedia.org/wiki/neural_network.*
Nicolao DE. G., et al., "Modelling the Volumetric Efficiency of IC Engines: Parametric, Non-parametric and Neural Techniques", Control Eng. Practice, Pergamon Press, vol. 4, No. 10, XP 001134999, pp. 1405-1415, 1996.

* cited by examiner

*Primary Examiner*—Willis R. Wolfe, Jr.
*Assistant Examiner*—Johnny H Hoang
(74) *Attorney, Agent, or Firm*—Oblon, Spivak, McClelland, Maier & Neustadt, L.L.P.

(57) ABSTRACT

A method for controlling a motor vehicle. According to the method, a volumetric filling efficiency for air in the motor is determined using a network of artificial neurones.

11 Claims, 4 Drawing Sheets

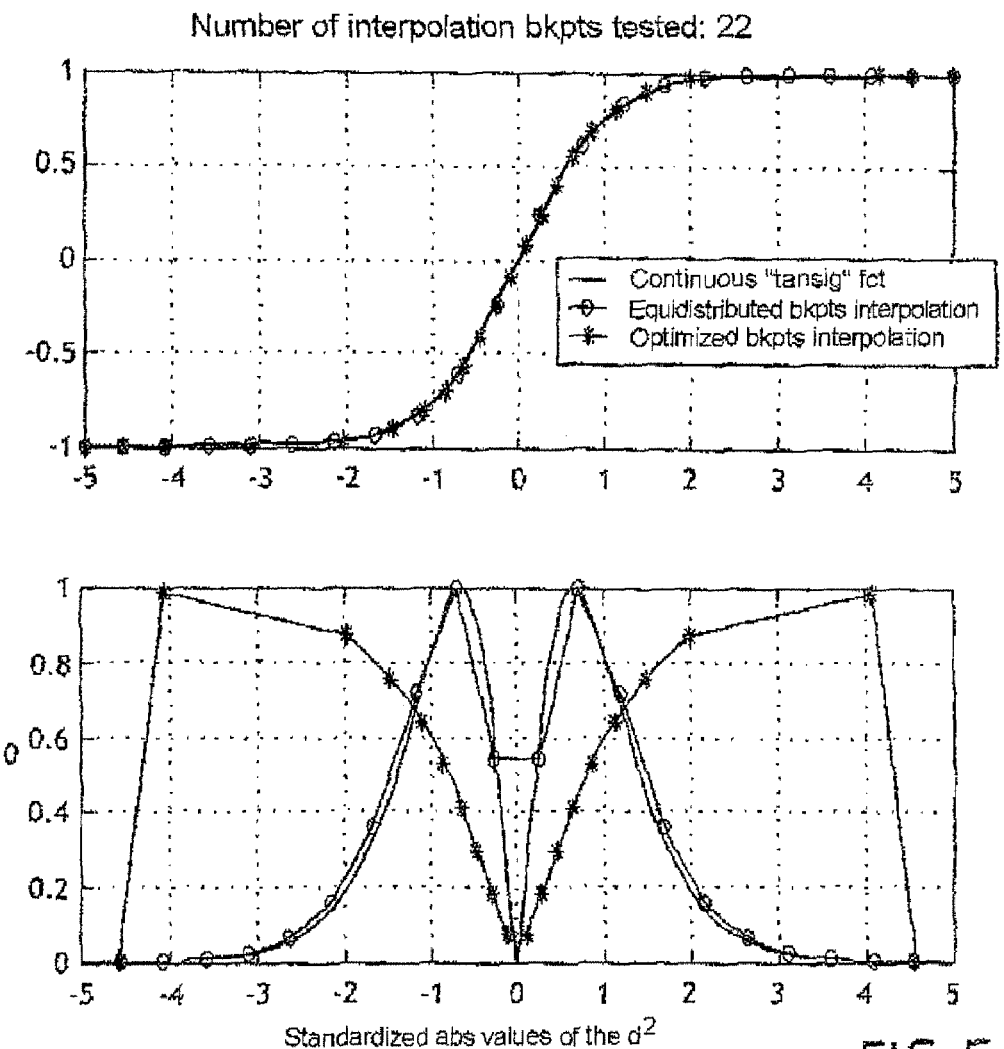
FIG_5
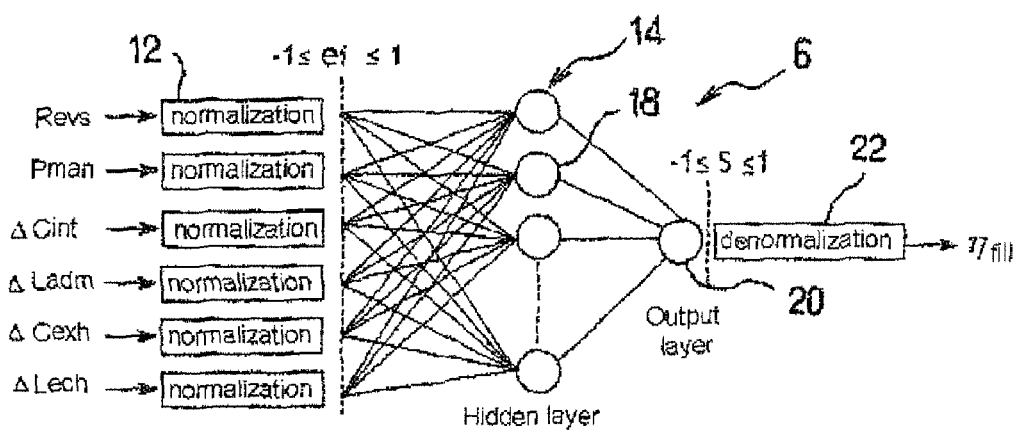
ΔLadm = Delta inlet valve lift/reference lift
ΔLech = Delta exhaust valve lift/reference lift
FIG_7

METHOD FOR CONTROLLING A MOTOR VEHICLE USING A NETWORK OF NEURONES

The invention relates to the control of vehicle engines, in particular petrol engines.

The increasing complexity of internal combustion engines requires the ever more frequent use of models of certain physical quantities either because they are not measurable, or because a suitable sensor is expensive. These models are generally dynamic so that the output is predicted as a function of the current and past values of the input variables. These models are integrated in the computer for controlling the engine. Given that the latter is limited in terms of memory and calculation power, one wishes to limit to the maximum the complexity of the models which reside therein. Additionally, the complexity of the systems as well as the precise use that one wants to make thereof in order to satisfy the requirements in terms of monitoring and depollution standards entails increased estimation and modeling precision.

In particular, a petrol engine generally uses an injection system that calculates a fuel requirement on the basis of measured information relating to the pressure in the manifold, the engine revs and the air temperature in the manifold. One then seeks to model the relative filling efficiency so as to characterize the amount of air actually entering the engine. This amount of air is thereafter translated into an amount of fuel to be injected as a function of a richness objective. This calculation can be performed in the following manner:

$$(Pman-P0)*Vcyl*\eta fill = Mair*r*Tair$$

i.e. $Mair = \dfrac{(Pman - P0) * Vcyl * \eta fill}{r * Tair}$ and the associated petrol mass: $Mpet=Mair*Ri/14.7$
i.e. the effective injection time:

$$Ti = \dfrac{Mpet}{Qstat} = \dfrac{1}{14.7 * Qstat} * Mair * Ri$$

with:
Vcyl=Unit capacity of the engine (in m3)
Ri=Setpoint richness (s.u)
14.7=stoichiometric ratio for commercial petrol (kg of air/kg of petrol)
Qstat=Injector static flowrate at fixed ramp pressure (kg/s)
Pman=Manifold pressure
P0=Manifold pressure for zero flowrate
Mair. Mass of air entering the engine (in kg)
Mpet=Mass of petrol to be injected (in kg)
$\eta fill$=Volumetric filling efficiency (s.u)

The volumetric filling efficiency $\eta_{fill}$ is characteristic of the configuration of the engine (the associated volumes, the length and shape of the intake and exhaust manifolds, the materials employed and the surface condition of the ducts constituting them). It is also characterized by the lift laws for the intake and exhaust valves and their phasing in the engine cycle. It depends on the pressure in the manifold, the engine revs and finally the timing of the intake and exhaust camshafts (called AAC or vvT), in particular if the engine is equipped with a variable timing system for these shafts The determination of this efficiency by parametric laws (of parabolic or other type) involves numerous mapping corrections that are complex to implement and do not afford any knowledge regarding the physical phenomenon to be processed.

More generally, it is known to estimate the filling of the engine by simple mapping correction for engines with no intake camshaft shifter. This correction implements a single mapping dependent on the pressure in the manifold and the engine revs.

It is known also to perform a dual mapping correction in engines furnished with an ON/OFF intake camshaft shifter. In this case, the engine comprises a mapping by position, on or off, of the camshaft shifter, dependent on the pressure in the manifold and the revs.

The document "Modelling the volumetric efficiency of IC engines: parametric, non-parametric and neural techniques" by G. DE NICOLAO proposes a method of controlling an engine in which an air filling volumetric efficiency is determined.

Finally, more elaborate mapping corrections in engines comprising a continuous intake camshaft shifter are known. In this case, a mapping is implemented as a function of pressure and revs for a reference position of the shifter and parabolic corrections are performed, associated with coefficients that are mapped as a function of pressure and revs.

An air of the invention is therefore to improve the control of vehicle engines, and in particular to improve the estimation of the relative filling efficiency, for example in the case of an engine equipped with a dual intake and exhaust camshaft shifter.

For this purpose, the invention envisages a method of controlling a vehicle engine, in which an air filling volumetric efficiency is determined for the engine, characterized in that a base value of the efficiency, and a correction value are determined by means of an artificial neural net, and the base value and the correction value are added together.

The method according to the invention will be able furthermore to exhibit at least any one of the following characteristics:
the efficiency is determined as a function of engine revs;
the efficiency is determined as a function of a pressure in a manifold of the engine;
the efficiency is determined as a function of a difference between a timing setpoint for an intake camshaft and a measurement of a position of the shaft;
the efficiency is determined as a function of a difference between a timing setpoint for an exhaust camshaft and a measurement of a position of the shaft;
the efficiency is determined as a function of a difference between an intake valve lifting law and a position of the valve,
the efficiency is determined as a function of a difference between an exhaust valve lifting law and a position of the valve;
the efficiency is determined as a function of a ratio between a setpoint torque of the engine and a maximum torque;
the base value is determined as a function of a pressure in the intake manifold and/or of engine revs;
the net comprises a single hidden layer;
the net activation function is the tansig function; and
an activation function for the net is discretized between non-equidistant points.

The invention also envisages a vehicle engine comprising a control member able to determine an air filling volumetric efficiency for the engine, the control member comprising a neural net.

Advantageously, the engine will comprise an intake camshaft and/or exhaust camshaft variable timing device or else a variable lifting device for intake valves and/or exhaust valves.

Other characteristics and advantages of the invention will be further apparent in the following description of a preferred embodiment and of a variant given by way of non-limiting examples with reference to the appended drawings in which:

FIG. 1 is a flowchart illustrating the general implementation of the method in the present example;

FIG. 2 comprises two flowcharts illustrating the obtaining of the correction values associated with the variable timing of the intake and exhaust camshafts;

Figure 3:
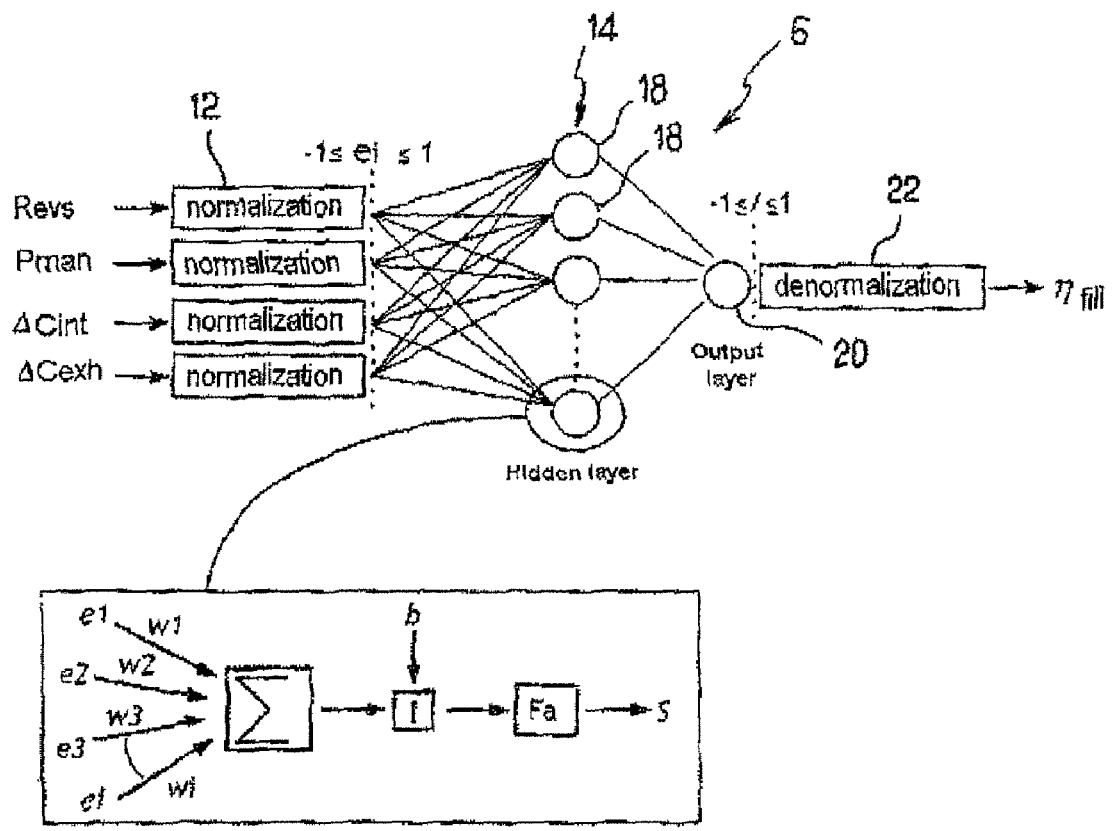
FIG. 3 is a flowchart illustrating the use of the neural net in the method of FIG. 1.
Figure 6:
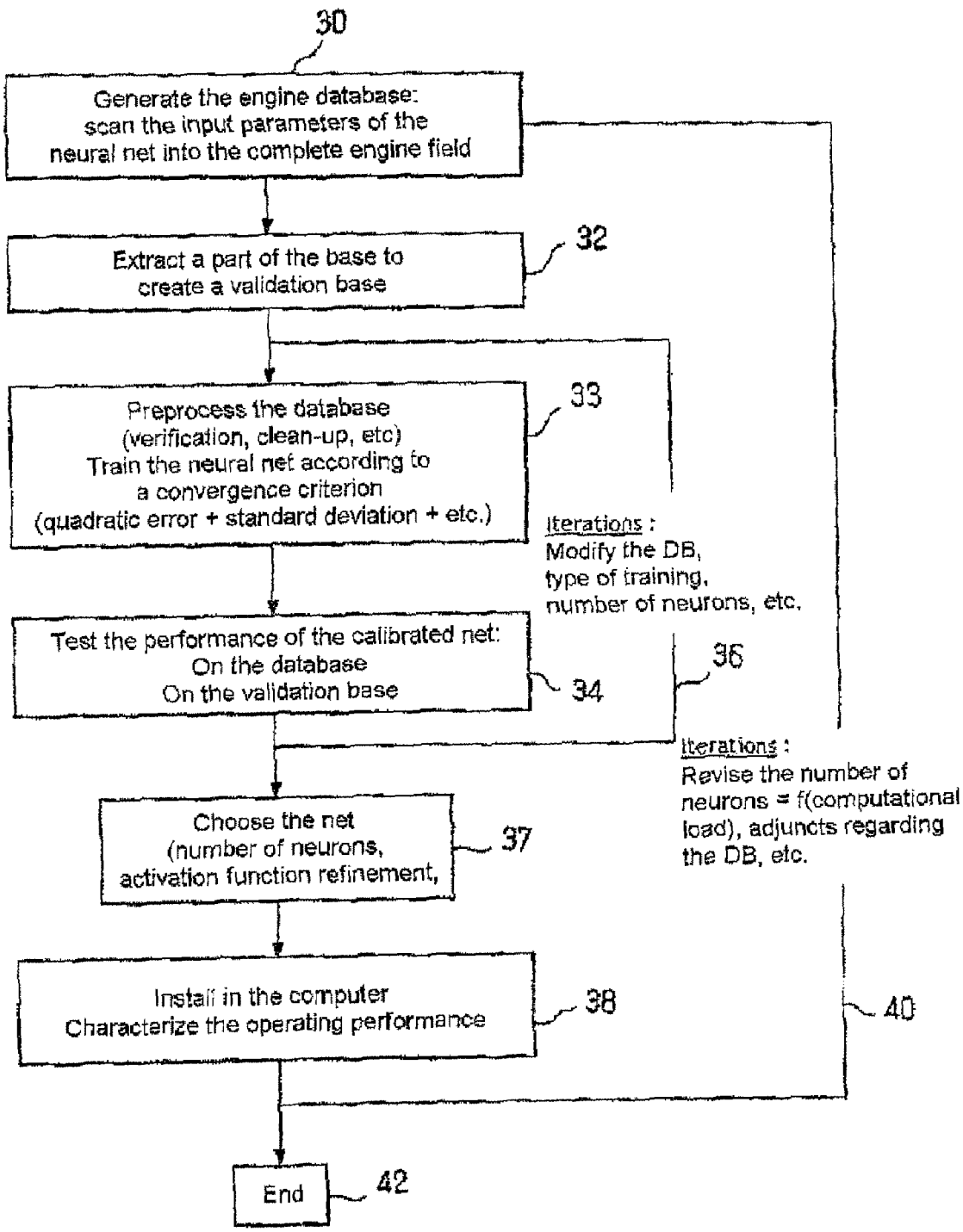

FIG. 5 presents other graphs relating to this function;

FIG. 6 is a flowchart illustrating the process for choosing the neural net and calibration thereof; and FIG. 7 is a view analogous to FIG. 3 illustrating a variant embodiment.

The invention relates to a motor vehicle petrol internal combustion engine. This engine comprises a computer ensuring the control of the engine and comprising in this instance an artificial neural net. A net of this type is known per se and will not be described in detail here.

The net is aimed at determining an air filling volumetric efficiency for the engine, and more precisely at modeling this parameter. First of all, a reference mapping, tuned using the engine's nominal reference timings, is used to define a reference filling value or base filling value. Then, a filling correction value modeled by the neural net is used to correct this filling, in this instance by addition to the base value. A characterization is thus obtained of the actual filling of the engine away from the engine's nominal operating points.

Figure 1:
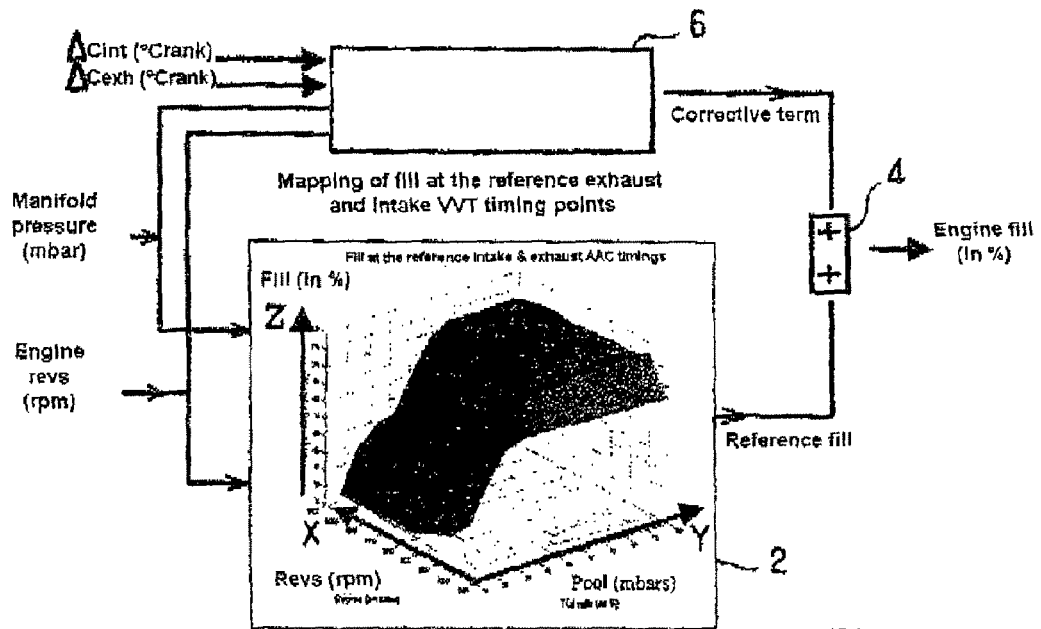

The principle of this determination has been illustrated in FIG. 1. The box 2 represents the implementation of a mapping indicating a reference value of the engine filling efficiency Z as a function of a measurement of the engine revs along the abscissa axis X and as a function of a pressure measured in an intake manifold of the engine and plotted as Y along the ordinate axis. The engine being in this instance provided with variable-timing intake and exhaust camshafts, the mapping provides the filling values on the timing points chosen by the tuner.

As indicated in the upper part of FIG. 1, this reference filling value is thereafter corrected in the block 4 by addition of a corrective term that is determined in parallel in the block 6 by the neural net.

The neural net calculates this correction as a function of the following parameters:
  the measured engine revs;
  a pressure measured in the intake manifold of the engine;
  a difference between a setpoint value of the timing of the intake camshaft that is chosen by the tuner and a measurement of the actual position of this camshaft; and
  a difference between a setpoint value of the timing of the exhaust camshaft that is chosen by the tuner and a measurement of the actual position of this camshaft.

The sum of the base values and of the corrective term provides the final value of the filling efficiency to be modeled.

Figure 2:
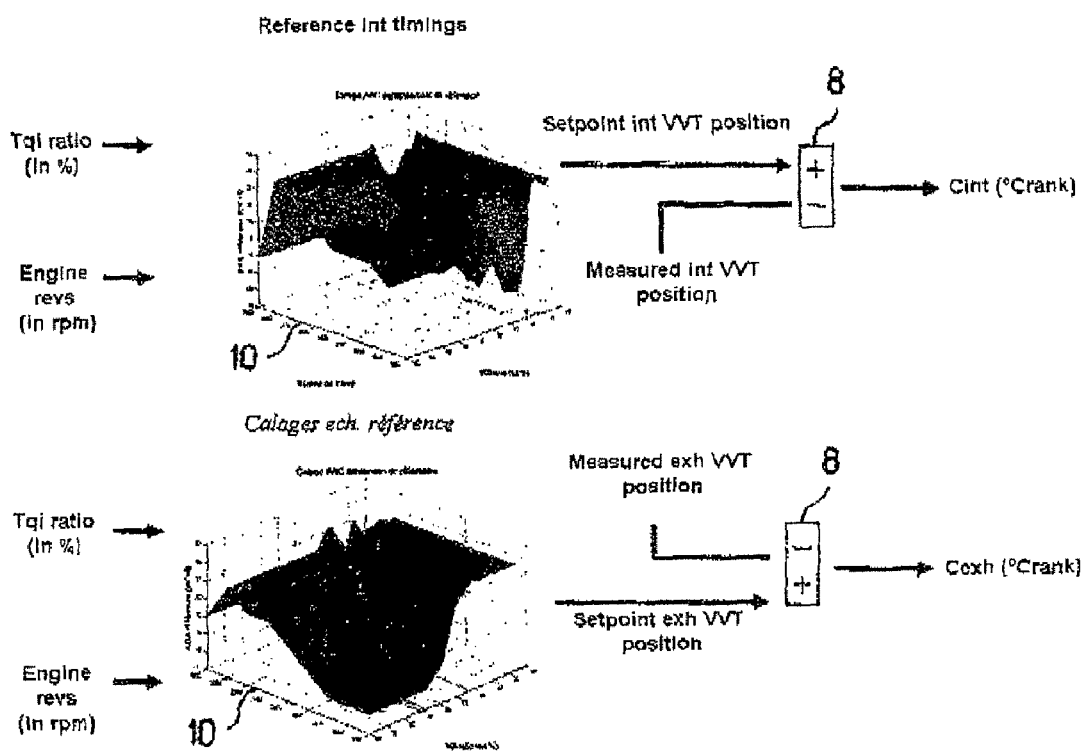

Illustrated in FIG. 2 are the details of how the shifts in position of the intake and exhaust camshafts are obtained.

The first diagram indicates that for the intake shaft the difference is computed between the timing setpoint position and the actual position of this shaft such as it is measured. Subtraction of these two values in the block 8 makes it possible to determine the difference in timing on this shaft. The shaft shift value is indicated in degrees of crankshaft angle.

As regards the timing setpoint value, it is determined previously in the block 10 by mapping on the basis:
  of the measured engine revs;
  of the ratio of the setpoint torque (arising from the driver's wishes via the position of the accelerator, the engine revs and other parameters) and of the maximum torque available on the engine (essentially dependent on the engine revs and the temperature of the air).

The determination of the shift value relating to the exhaust shaft is performed exactly in the same manner.

The content and the operation of the neural net used in this instance has been illustrated in FIG. 3. The engine revs, the pressure in the manifold and the differences in timing on the intake and exhaust shafts with respect to the reference timings are entered as input parameters to this net.

In the block 12, these various inputs are first of all normalized between values of −1 and +1. On completion of this normalization stage, they are thereafter used in each neuron of the hidden layer 14 of the neural net 6. Precisely, to each neuron input (e1=engine revs, e2=manifold pressure, e3=$\Delta C_{int}$, e4=$\Delta C_{exh}$), is assigned a weight (w1 for the revs, w2 for the manifold pressure, etc.). Moreover, to each neuron 18 of the layer 14 is assigned a bias denoted b. An activation function Fa is also assigned to the whole set of neurons. Each neuron 18 provides an output datum, denoted S, which is a linear combination of the input data (the ei values) assigned their weight (the wi values), this combination being submitted to the activation function (Fa). This operation satisfies the following formula:

$$S=Fa(\Sigma_i wi*ei+b)$$

The neural net implements an algorithm for optimizing the weight terms (wi) and biases (b) for each neuron as a function of the activation function chosen by the user.

The output of each neuron is thereafter used in the output layer 20 where a combination of the outputs of each neuron is performed according to the same calculation (but with different weights and a different bias) as for the hidden layer 14.

Ultimately, the output value of the neural net is thereafter denormalized in the block 22 so as to best describe the sought-after variable which here is the filling efficiency.

It is specified that the normalization between −1 and +1 of the inputs in the block 12 allows optimization of the weights and biases over the dimensionless variables.

The hidden layer 14 is in this instance unique. It has in fact been demonstrated that any piecewise continuous function can be approximated by such an architecture.

As far as the choice of the number of neurons of the hidden layer is concerned, it has to be determined as a function of two essential constraints: on the one hand, the accuracy of the filling modeled by the neural net, on the other hand the number of operations and calibrations that are acceptable for real-time processing by the engine control computer It is important to carefully choose the activation function for each neuron so as to ensure the performance of the net. The activation function adopted in this instance is the tansig function. This mathematical function is defined by the following formula:

$$\tan sig(n) = \frac{2}{1+e^{-2n}} - 1$$

Figure 4:
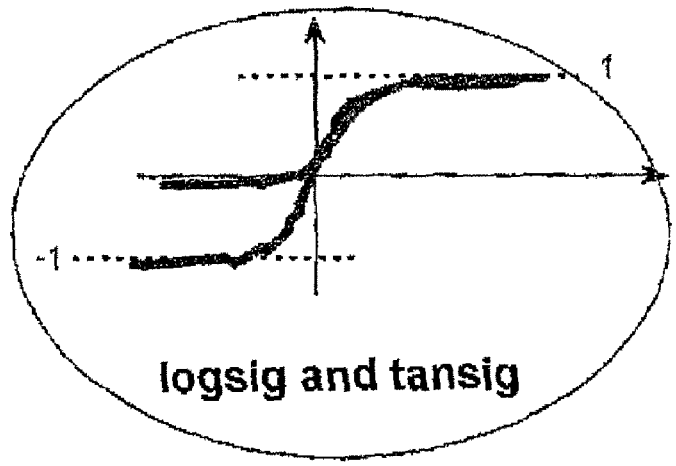
FIG. 4 is a graph of the activation function implemented in the net of FIG. 3.

The shape of the curve of the logsig and tansig functions has been illustrated in FIG. 4.

In order to be able to be used by the computer but also during the procedure for optimizing the neural net, this function must be discretized in a table. During the calculations for optimizing the points and biases of the net or for the calculation of the filling efficiency, the table is thereafter used in a discrete manner by linear interpolation.

The choice of the optimization criterion for the function makes it possible to minimize the error made by replacing a continuous function with a piecewise linear function. It is noted that the solution consisting in discretizing the function as a large number of equidistant points is not the best since it is expensive in terms of the number of calibrations. It turns out to be more advantageous to use a discretization implementing non-equidistant points so as to reduce the size of the mapping while preserving good accuracy in the output datum.

The optimization criterion adopted between the linear function and the discretized function is the optimization of the positioning of the support points (or breakpoints) by minimizing the deviation in second derivative between the linear function and the discretized function. It is in fact clear that the bigger the variation in the slope of the function between the points, the less correct is a linear interpolation between these points.

The result of optimizing the positioning of the points (the number of which is in this instance fixed at 22) by minimizing the deviation in second derivative between the continuous function and the interpolated function has thus been illustrated in FIG. 5.

Illustrated on the first graph of FIG. 5 is an "s" curve which is that of the activation function used throughout the neural net and in this instance in each neuron of the net. The linear discretization is aimed at representing the continuous tansig function according to a one-dimensional table which is easily usable in the engine control software. This discretization has been illustrated in the same picture. It is here optimized so as to minimize the calculation errors when using the algorithm for optimizing the weights (wi) and biases (b) of the neural net. On the one hand interpolation by equidistributed breakpoints and on the other hand interpolation by optimized breakpoints have thus been illustrated on this curve.

The second figure represents the second derivative, called $d^2$, of various functions:

the continuous exact tansig function;
the tansig function discretized linearly by equidistant breakpoints; and finally
the tansig function discretized linearly by breakpoints whose positioning is optimized so as to minimize the deviation in absolute value between the second derivative of the continuous exact function and the second derivative of the discretized function.

It will be borne in mind that the normalization of the continuous or interpolated second derivatives induces an error in the actual performance of the table corresponding to the optimized breakpoints.

The process for choosing the neural net and calibration thereof have been illustrated in FIG. 6. Specifically, the choice of the number of neurons is important for the calculational load in the microprocessor and for the accuracy of the modeling obtained.

Thus, the generation of the engine database takes place in the block 30. It implements the scanning of the input parameters of the neural net into the complete engine field.

This block leads to the block 32 which performs an extraction of a part of the base to create a validation base A preprocessing on the basis of the data (verification, cleanup, etc.) as well as a realization of the training of the neural net according to a convergence criterion (quadratic error+standard deviation+ etc.) takes place in the next block 33.

A test of the performance of the calibrated net, at one and the same time on the database and on the validation base, is implemented in the next block 34.

On completion of this block, an iteration loop 36 returns it necessary between blocks 32 and 33 with a view to a modification to the database, the type of training, the number of neurons, etc.

If the test 34 is conclusive, the next block 36 implements the choice of the net (in particular the number of neurons and the refinement of the activation function).

This block then leads to the block 38 which pertains to the installing of the neural net in the computer and the characterization of the performance while operational.

A second iteration loop 40 pertaining to the revision of the number of neurons as a function of the calculational load or else of adjuncts to the database starts on output from this block. If no iteration is necessary, block 38 leads to the end block 42.

The method according to the invention makes it possible to take into account within the framework of the engine each of the intake and exhaust camshaft continuous shifters in the parametric corrections of the filling. The estimation of the relative filling efficiency of the engine equipped with this dual camshaft shifter is implemented on the basis of estimating the mass of air admitted with the aid of the manifold pressure sensor, the intake air temperature and the engine revs. It makes it possible to ensure optimal control of the injection outside of any closed-loop injection time correction by using information relating to an exhaust richness probe.

A variant implementation of the method has been illustrated in FIG. 7. The latter is very similar to the mode of FIG. 3. However, here the engine is fitted with a system for variable lifting of valves on intake and on exhaust. The shift between the lift setpoint law for the valves and the actual position of the valves is taken into account in the guise of two additional inputs with respect to the four previously stated for the neural net. Specifically, the architecture with neural net is predisposed to allow an enhancement of the modeling related to engine modifications.

Of course, it will be possible to make numerous modifications to the invention without departing from the scope thereof.

It will be possible to choose an activation function other than the tansig function.

The invention claimed is:

1. A method of controlling a vehicle engine, in which an air filling volumetric efficiency is determined for the engine, comprising:

determining a base value of the volumetric efficiency from a reference mapping;

determining a correction value of the volumetric efficiency by an artificial neural net, the artificial neural net including, as input parameters, engine revs, pressure in an intake manifold of the engine, a difference between a timing setpoint for an intake camshaft and a measurement of a position of the intake camshaft, and a difference between a timing setpoint for an exhaust camshaft and a measurement of a position of the exhaust camshaft;

adding the base value and the correction value together to determine a corrected value of the volumetric efficiency; and injecting an amount of fuel to the engine based on the corrected value of the volumetric efficiency.

2. The method as claimed in claim 1, wherein the determining the correction value includes a difference between an intake valve lifting law and a position of the valve as one of the input parameters.

3. The method as claimed in claim 1, wherein the determining the correction value includes a difference between an exhaust valve lifting law and a position of the valve as one of the input parameters.

4. The method as claimed in claim 1, wherein the determining the correction value includes a ratio between a setpoint torque of the engine and a maximum torque as one of the input parameters.

5. The method as claimed in claim 4, wherein the base value is determined from the reference mapping as a function of the pressure in the intake manifold and/or of the engine revs.

6. The method as claimed in claim 1, wherein the artificial neural net comprises a single hidden layer.

7. The method as claimed in claim 1, wherein an activation function of the artificial neural net is a tansig function.

8. The method as claimed in claim 1, wherein an activation function for the artificial neural net is discretized between non-equidistant points.

9. A vehicle engine, comprising:
a control member configured to determine an air filling volumetric efficiency for the engine, the control member comprising a reference mapping and a neural net, and the control member is configured to
determine a base value of the volumetric efficiency from the reference mapping,
determine a correction value by the neural net, the neural net including, as input parameters, engine revs, pressure in an intake manifold of the engine, a difference between a timing setpoint for an intake camshaft and a measurement of a position of the intake camshaft, and a difference between a timing setpoint for an exhaust camshaft and a measurement of a position of the exhaust camshaft,
add together the base value and the correction value to determine a corrected value of the volumetric efficiency, and
control an amount of fuel injected to the engine based on the corrected value of the volumetric efficiency.

10. The engine as claimed in claim 9, further comprising an intake camshaft and/or exhaust camshaft variable timing device.

11. The engine as claimed in claim 9, further comprising a variable lifting device for intake valves and/or exhaust valves.

* * * * *